US009466404B2

(12) United States Patent
Guthrie

(10) Patent No.: US 9,466,404 B2
(45) Date of Patent: Oct. 11, 2016

(54) RIGID/PLIABLE SECTIONAL RESIN INFUSED SHIELDED WIRE HARNESS

(71) Applicant: ROHR, INC., Chula Vista, CA (US)

(72) Inventor: Paul Guthrie, Ayrshire (GB)

(73) Assignee: Rohr, Inc., Chula Vista, CA (US)

(*) Notice: Subject to any disclaimer, the term of this patent is extended or adjusted under 35 U.S.C. 154(b) by 212 days.

(21) Appl. No.: 14/106,255

(22) Filed: Dec. 13, 2013

(65) Prior Publication Data
US 2015/0170790 A1 Jun. 18, 2015

(51) Int. Cl.
*H01B 5/12* (2006.01)
*B60R 16/02* (2006.01)
*H02G 3/04* (2006.01)
*H01B 13/012* (2006.01)

(52) U.S. Cl.
CPC ............ *H01B 5/12* (2013.01); *B60R 16/0215* (2013.01); *H02G 3/0406* (2013.01); *H02G 3/0481* (2013.01); *H01B 13/01263* (2013.01)

(58) Field of Classification Search
None
See application file for complete search history.

(56) References Cited

U.S. PATENT DOCUMENTS

| | | | | |
|---|---|---|---|---|
| 3,576,940 A * | 5/1971 | Stone | ..................... | H01B 7/295 174/113 R |
| 4,032,708 A * | 6/1977 | Medney | ................... | H02G 9/06 174/36 |
| 4,064,359 A * | 12/1977 | Peterson et al. | .............. | 174/107 |
| 4,091,139 A * | 5/1978 | Quirk | ............................ | 442/117 |
| 4,408,088 A * | 10/1983 | Foote | ........................... | 136/226 |
| 5,194,838 A * | 3/1993 | Cobo | ................ | H01B 11/1813 174/28 |
| 5,414,212 A * | 5/1995 | Clouet et al. | ................... | 174/36 |
| 5,796,042 A * | 8/1998 | Pope | ...................... | H01B 7/288 174/102 SP |
| 7,255,602 B1 * | 8/2007 | Driessen | .................. | H01R 4/01 439/607.47 |
| 7,687,714 B2 * | 3/2010 | Deterre et al. | .............. | 174/72 R |
| 2002/0006743 A1 * | 1/2002 | Kanagawa | ......... | H01R 13/6592 439/98 |
| 2004/0057187 A1 * | 3/2004 | Kuboshima | ............ | H01R 9/032 361/118 |
| 2006/0237218 A1 * | 10/2006 | Glew | ..................... | H01B 11/06 174/113 C |
| 2006/0237219 A1 * | 10/2006 | Glew | ..................... | H01B 11/06 174/113 C |
| 2006/0278423 A1 * | 12/2006 | Ichikawa et al. | ........... | 174/72 A |
| 2012/0247828 A1 * | 10/2012 | Kakuta et al. | .............. | 174/72 A |
| 2012/0252272 A1 * | 10/2012 | Omae | .................. | H01R 13/506 439/607.01 |
| 2013/0299229 A1 * | 11/2013 | Kato | ...................... | H02G 15/02 174/377 |
| 2014/0027151 A1 * | 1/2014 | Huang | ..................... | H01B 7/17 174/109 |
| 2014/0079359 A1 * | 3/2014 | Yu | ............................. | G02B 6/44 385/101 |
| 2014/0080355 A1 * | 3/2014 | Wang | ................... | H01R 13/641 439/573 |
| 2014/0216812 A1 * | 8/2014 | Adachi | ............... | B60R 16/0215 174/72 A |
| 2015/0194795 A1 * | 7/2015 | Rohr | ...................... | H01R 9/032 174/72 A |

OTHER PUBLICATIONS

Office Action dated Sep. 25, 2015 in French Application No. 14 62051.

* cited by examiner

*Primary Examiner* — Jeremy C Norris
*Assistant Examiner* — Muhammed Azam
(74) *Attorney, Agent, or Firm* — Snell & Wilmer, L.L.P.

(57) ABSTRACT

Electrical harnesses and methods of manufacturing electrical harnesses are disclosed. Electrical harnesses may comprise an electrically conductive wire, and a resin infused braided shield surrounding a portion of the electrically conductive wire, wherein at least a portion of the braided shield is infused with a curable resin. Electrical harnesses may comprise an electrically conductive wire, and a braided shield surrounding a portion of the electrically conductive wire, wherein at least a first portion of the braided shield comprises a first cured resin imparting rigidity to the first portion of the braided shield and at least a second portion of the braided shield that is pliable.

15 Claims, 6 Drawing Sheets

RIGID/PLIABLE SECTIONAL RESIN INFUSED SHIELDED WIRE HARNESS

BACKGROUND

Electrical harnesses are often used to distribute signals and power to various components of a vehicle, such as to the various components in and around a gas turbine engine on an aircraft, to and from electrical components on an aircraft landing gear, or to and from electrical components on an automotive vehicle. Electrical power and signals to and from the individual electrical components are commonly transmitted along conductive wires. Such conductors may be in the form of wires and/or cables which may be assembled together in a harness. The connections between the individual components and the harness can be made, for example, by a multi-pin plug and/or socket connectors.

To protect a wire harness from coming into contact with hot surfaces, or with sharp edges, which combined with vibration may result in chafing and other forms of wear, a wire harness is typically supported by multiple brackets, clamps and clips. These brackets, clamps and clips are conventional hardware which are attached to a structure and in turn support or suspend the wire harness away from surfaces and components. Because wire harnesses are flexible, support is typically needed at close intervals along the length of the harness to prevent the harness from sagging and coming into contact with a surface. For aerospace components, where failure of a wire harness could result in a catastrophic failure, strict regulations dictate the maximum allowable intervals between a supportive bracket or clamp. These brackets or clamps each add incremental weight to the wire harness system, which in an aircraft reduces efficiency and increases expensive fuel burn. Also, the requirement for brackets or clamps at short intervals along a wire harness can dictate the path of a wire harness between components. The path of the harness must be adjacent to mounting structures where brackets and clamps can be mounted. Sometimes the most practical and suitable path for the harness is a path adjacent to appropriate mounting structures, but may not be the most efficient or direct path. Thus, the need for supportive brackets and clamps at regular, short intervals may make a run of wire harness longer than would otherwise be necessary and add additional weight.

To further protect the wires and cables a typical harness will also include various layers of thermal and electromagnetic insulation and overbraid protection (e.g., a polyether ether ketone ("PEEK") overbraid layer) to help protect the harness from chafing, high temperatures, electromagnetic interference, etc. These layers of insulation and protection also add additional weight to the wire harness system.

SUMMARY

Electrical harnesses and methods of making electrical harnesses are disclosed herein. In various embodiments, electrical harnesses comprising an electrically conductive wire, and a curable resin infused braided shield surrounding a portion of the electrically conductive wire, wherein at least a portion of the braided shield is infused with a curable resin are disclosed. In accordance with various embodiments, electrical harnesses are disclosed comprising an electrically conductive wire and a braided shield surrounding a portion of the electrically conductive wire, wherein at least a first portion of the braided shield comprises a first cured resin imparting rigidity to the first portion of the braided shield and at least a second portion of the braided shield that is pliable.

DETAILED DESCRIPTION

Figure 1:
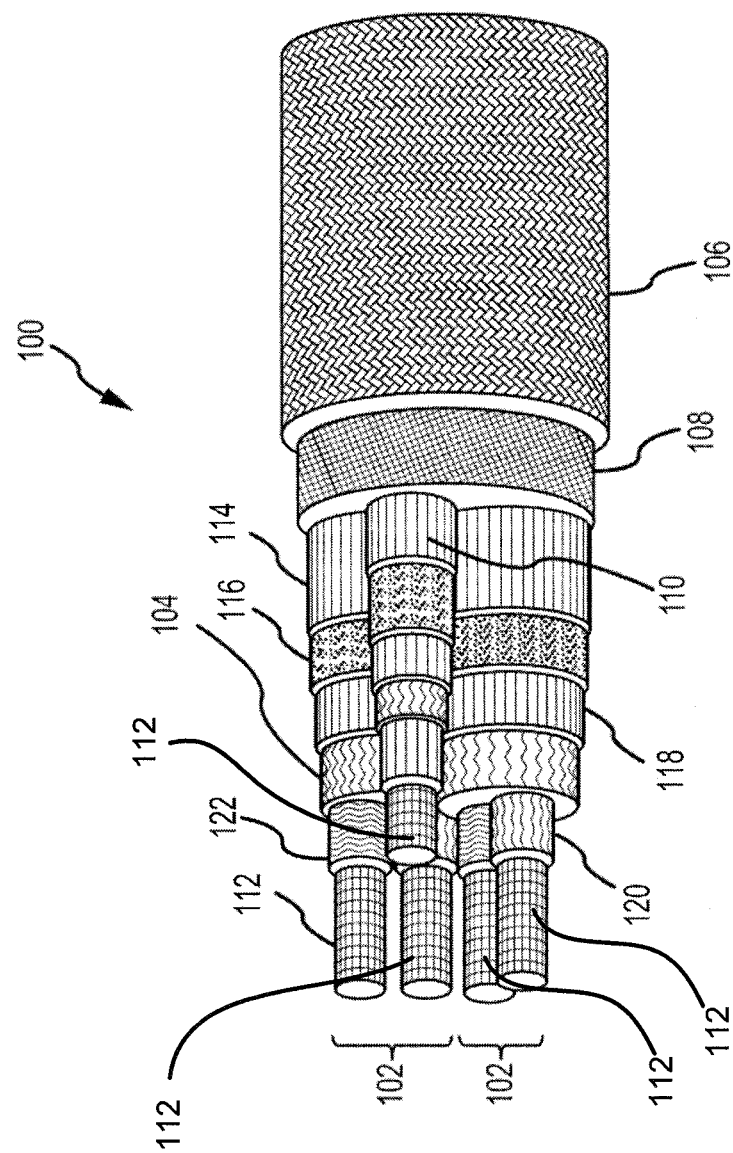
FIG. 1 illustrates a shield construction of a harness according to various embodiments.

The detailed description of exemplary embodiments herein makes reference to the accompanying drawings, which show exemplary embodiments by way of illustration and its best mode, and not of limitation. While these exemplary embodiments are described in sufficient detail to enable those skilled in the art to practice the various disclosed embodiments, it should be understood that other embodiments may be realized and that logical, chemical and mechanical changes may be made without departing from the spirit and scope of the claimed embodiments. For example, the steps recited in any of the method or process descriptions may be executed in any order and are not necessarily limited to the order presented. Moreover, many of the functions or steps may be outsourced to or performed by one or more third parties. Furthermore, any reference to singular may include plural embodiments, and any reference to more than one component or step may include a singular embodiment or step. Also, any reference to attached, fixed, secured, connected or the like may include permanent, removable, temporary, partial, full and/or any other possible attachment option. Additionally, any reference to direct contact may include touching a portion.

As described in detail herein, electrical harnesses are disclosed according to various embodiments. In various embodiments, disclosed electrical harnesses are capable of being used in vehicles, such as part of aircraft landing gear comprising an electrical system capable of transferring electrical signals or a gas turbine engine comprising an electrical system. In particular, electrical harnesses disclosed herein may be used in an engine build up area of a gas turbine engine.

The term "connector" may include any suitable electrical connector known now or hereinafter developed. The shape of the connector may be any shape, such as square, rectangular, conical, or circular. Various embodiments also include coupling connectors which may be coupled with or intermateable with various types of connectors, such as plugs or receptacles. Exemplary receptacles include receptacles which are compatible with connectors that comply with such industrial and governmental standards, such as EN2997, MIL-C-83723 Series III & ESC 10 connectors, and 983 series connectors commercially available from DEUTSCH, the connection platform of TE Connectivity®. In various embodiments, an electrical connector may comprise an aluminum shell and a stainless steel lock ring, a stainless steel shell and an aluminum lock ring, an aluminum shell and an aluminum lock ring, a stainless steel shell and a stainless steel lock ring. The particular material of connectors is not particularly limited and can include stainless steel, aluminum, and other metal alloys.

The term "electrically conductive wire" may include any suitable conductor, such as a wire having a central metal core capable of transmitting a signal and/or conducting electricity, conductive wires, and/or insulated conductive wires. In various embodiments, the metal may be copper, stainless steel, or any other metal or metal alloys capable of transmitting a signal and/or conducting electricity. The size of the electrically conductive wire is not particularly limited and can range from about 40 AWG (about 0.0799 mm) to about 0000 AWG (about 11.684 mm), from about 35 AWG (about 0.143 mm) to about 1 AWG (about 7.348 mm), and from about 15 AWG (about 1.450 mm) to about 5 AWG (about 4.621 mm).

The term "braided shield" may refer to a covering conductive layer of braided strands of metal fibers, synthetic fibers, metal clad synthetic fibers, and other suitable fibrous materials. Sizes of fiber braided shields are not particularly limited and can in various embodiments range from about 0.0062 inches (0.016 cm) to about 2.5 inches (6.35 cm) in diameter, from about 0.01 inches (0.0254 cm) to about 2 inches (5.08 cm) in diameter, and from about 0.1 inches (0.254 cm) to about 1 inch (2.54 cm) in diameter. In various embodiments, the diameter of a braided shield can vary, for example, due to harness branching.

In various embodiments, a braided shield can help to impart protection against electromagnetic interference ("EMI"), radio-frequency interference ("RFI"), electromagnetic pulses ("EMPs"), heat, vibration, chafing, and/or stress loads, such as tension or weight. Braided shields may comprise a nickel coated copper braided shields and/or metal clad fibers ("MCFs").

A nickel coated copper braided shield may comprise a braided structure braided from strands or fibers of nickel coated copper and/or alloys comprising one or more of the same. For example, in various embodiments, the braided shield can be a metal clad fiber ("MCF") and nickel coated copper braided shield composite. In various embodiments, the braided shields can effectively shield an electrically conductive wire across various frequencies, such as from about 0.1 MHz to about 40 GHz, from about 1 MHz to about 18 GHz, from about 15 MHz to about 500 MHz from about 30 MHz to about 100 MHz and from frequencies about 50 MHz and higher. The shielding effectiveness can also range in various embodiments, such as from about 0.1 db to about 95 db, from about 10 db to about 80 db, from about 25 db to about 70 db.

In various embodiments the braided shield may comprise a high strength braided shield. Various embodiments of high strength braided shields may have tensile strengths across a variety of ranges, such as from about 500 MPa to about 2,000 MPa, from about 1,000 MPa to about 1,700 MPa, and from about 1,200 MPa to about 1,600 MPa.

As used herein "metal clad fiber" or "MCF" may include various fibers clad in one or more metals. In various embodiments, metal clad fibers may include cladding of various metals and alloys thereof, such as nickel, silver, gold, tin, aluminum, copper, cadmium, zinc, and/or stainless steel. The fibers of metal clad fibers may also include various thermoplastic fibers, such as polymers comprising 4,6-diamino-1,3-benzenediol dihydrochloride. Exemplary metal clad fibers include nickel clad thermoplastic fibers (as sold under the mark AmberStrand® Nickel Clad Fibers), silver clad thermoplastic fibers (as sold under the mark AmberStrand® Silver Clad Fibers), stainless steel micro filaments, and nickel plated stainless steel micro filaments (as sold under the mark ArmorLite™), all of which are commercially available from Glenair®. Other examples of metal clad fibers include metal clad fibers incorporating aramid fibers (e.g., Kevlar®, which is a registered mark of E.I. du Pont de Nemours and Company), such as metal clad aramid fibers sold under the mark Aracon®, which are commercially available from Micro-Coax, Incorporated, or carbon fibers. In various embodiments, MCF may be used to enhance lower frequency shielding performance and provide protection against lightning. In various embodiments, MCF may also offer protection against engine environments, such as temperature changes, high vibrations, fluids, chemical resistance, and may offer galvanic capabilities.

The term "resin" and "curable resin" may be used throughout this disclosure synonymously, and may refer to material which may impregnate a braided shield and subsequently harden. For example, the term "resin" may refer to any fluid, whether natural or synthetic, that that is capable of hardening. For example, a synthetic resin may take the form of a fluid such as a viscous liquid that is capable of irreversibly hardening after a curing process is performed (e.g., a thermoset). Exemplary resins according to various embodiments include at least one of an epoxy resin, a polyurethane resin, a methacrylate resin, and mixtures thereof. The epoxy resin may include epoxy adhesives, such as one-part epoxy adhesive systems (e.g., Aralidite® 204, which is commercially available from the Huntsman Corporation) or two-part epoxy adhesive systems. Exemplary two-part epoxy adhesive systems include various epoxy resins and epoxy resin systems capable of service temperatures up to about 500° F. (about 260° C.), such as Hysol® EA 9396/C2 epoxy paste adhesive commercially available from the Henkel Corporation.

A resin may harden in response to a curing process, such as in response to exposure to heat, in response to, exposure to ultraviolet ("UV") light, in response to exposure to a catalyst, in response to the removal of a solvent, and various combinations thereof. A curing process initiates a chemical change in the resin to cause the resin to become hardened and/or rigid. For example, a curing process may include the application of heat via, for example, a heat gun, oven, autoclave, heat lamp, or heat pad. Curing may also be achieved by the application of a chemical agent to cause the resin to harden and/or become rigid. Curing may also be achieved by the exposure of the resin to UV light.

According to various embodiments, suitable one-part or suitable two-part adhesive systems may be used and the type of adhesive is not particularly limited. Various embodiments may contain resins with or without a reactive diluent. For example, suitable two-part adhesive systems may contain an epoxy resin with or without a reactive diluent in one component and in another component may contain one or more curing agents, which on mixing with the first component may cause the mixture to harden. According to various embodiments, suitable inert filler may be uniformly incorporated in one or both components. The filler may be either nonsettling or readily dispersible in any component in which it is incorporated. In various embodiments, suitable adhesive systems may cure under humid conditions, and bond to damp surfaces. Various properties such as consistency, gel time, filler content, epoxy equivalent, viscosity, absorption, bond strength, thermal compatibility, heat deflection temperature, linear coefficient of shrinkage, compressive yield strength and modulus, tensile strength and elongation at break, and contact strength may be altered according to desired characteristics by one of ordinary skill in the art.

Suitable two-part epoxy adhesive systems include Hysol® EA 9396/C2 epoxy paste adhesive commercially available from the Henkel Corporation. Other suitable two-part epoxy adhesive systems include Epibond® 100A/B, Epibond® 1217-A/B, Epibond® 420-A/B, Epibond® 8543-C/B, Epibond® 1539-A/B, Epibond® 1534-A/B Epibond® 1536-A/B, Epibond® 104-AB, Epibond® 1210-A/96115A, Epibond® 1210-A/B, Epibond® 156-AB, Epibond® 1559-1-A/B, Epibond® 1210-A/9861, Epibond® 1565-A/B, Aralidite® 2013, and Araldidite® 2015, all commercially available from the Huntsman Corporation.

Suitable polyurethane adhesives in various embodiments, include Uralane 5754 A/B, Uralane® 5759 G/D, and Uralane® 5774 A/C, all commercially available from the Huntsman Corporation. Suitable methacrylate adhesives include Araldite® 2047-1, Araldite® 2048, and Araldite® 2052-1, all commercially available from the Huntsman Corporation. Suitable UV curing adhesives include Hysol® UV3000, Hysol® UV3000LH, and Hysol® UV3001, all commercially available from the Henkel Corporation.

The term "resin infused" may include a braided shield where resin has been applied. Application of resin to a braided shield should be able to sufficiently fill gaps between the fibers of a braided shield to impart increased rigidity, strength, or protection after being subjected to a curing process. For example, a braided shield wherein the resin is infused with a brush (e.g., a paintbrush), under a vacuum (e.g., vacuum infiltration), or with external pressure (e.g., with the aid of heat shrink tape or an autoclave) would be referred to as resin infused. For example, a brush application may be used to infuse a resin into a braided shield. The resin may then become infused between the gaps of the fibers of the braided shield, imparting improved rigidity and strength upon curing. In further embodiments, the infusing may be performed under a partial vacuum or under a partial vacuum in addition to the application of external pressure (e.g., in an autoclave). A vacuum may encompass any reduced pressure (e.g., less than about 758 torr (about 101 kPa) or less than about 600 torr (about 80 kPa)). In various embodiments, a resin infused braided shield may comprise resin infused across the entire length of the braided shield.

The term "resin infused" may include a braided shield wherein at least a portion of the braided shield is infused with a resin. In various embodiments, the outer most braided shield may be resin infused. According to various embodiments, a resin infused shield may include a harness wherein at least a first portion of the braided shield comprises a first cured resin imparting rigidity to the first portion of the braided shield and at least a second portion of the braided shield that is pliable. A pliable braided shield may refer to a braided shield that is able flex or bend. A pliable braided shield may be free of resin (i.e., not resin infused) or may be at least partially resin infused. A pliable braided shield that is at least partially resin infused has not been subjected to a curing process. Accordingly, in such embodiments, the resin has not yet imparted rigidity to the pliable braided shield. A pliable braided shield may allow for the harness to remain flexible so that during installation, the final shape of the harness can be adjusted to fit the installation more precisely and, in various embodiments, the uncured resin may then be cured using a suitable curing process. Additionally, a pliable braided shield may allow for the harness to remain flexible, so as to reduce packaging for shipping and, thus, may reduce shipping costs.

The second portion the braided shield may be disposed between the first portion of the braided shield and a third portion of the braided shield that comprises a second cured resin according to various embodiments. The length of the second portion is not particularly limited an may comprise between about 5 percent and 50 percent, from about 10 percent to about 45 percent, or from about 15 percent to 25 percent of the total length of the electrical harness. In various embodiments, the second portion of the braided shield may be disposed between the first portion of the braided shield and an electrical connector.

In various embodiments the electrical harness may comprise a third portion of the braided shield that is pliable. In various embodiments the first and second portions of a resin infused harness may be cured with different resins (e.g., a first cured resin and a second cured resin) or identical resins. In some embodiments the second portion of the braided shield may comprise an uncured resin.

The term "hardened" may include a resin or a resin infused braided shield sufficiently cured to substantially prevent deformation of a braided shield due to external forces (e.g., gravity). For example, in various embodiments, a hardened portion of a braided shield may be sufficiently rigid to prevent substantial sagging between clamps spaced about 6 inches or more apart, about 12 inches or more apart, about 24 inches or more apart, about 42 inches or more apart, or about 60 inches or more apart. The term "substantial sagging" may include sagging which may affect the safety or airworthiness of a harness, for example in a turbojet engine or nacelle.

According to various embodiments, resins may be cured through the application of heat, such as from a heat gun, a heat lamp, a heat pad, an oven, and an autoclave. Various resins (e.g., epoxy adhesives) may have different curing temperatures and curing times and, thus, curing times and temperatures may vary accordingly. Exemplary temperatures include temperatures from about 60° F. (about 15.56° C.) to about 500° F. (about 260° C.), from about 100° F. (about 37.78° C.) from about 320° F. (about 160° C.), from about 150° F. (about 65.6° C.) to about 300° F. (about 149° C.), and from about 250° F. (about 121° C.) to about 265° F. (about 129° C.). Curing time may range from about 1 minute to about 3 days, from about 10 minutes to about 7 hours, from about 35 minutes to about 5 hours, and from about 2 hours to about 3 hours.

The term "fiberglass" may encompass any glass fiber and may include glass fibers that are compatible with various resins (e.g., polyester resins, vinyl ester resins, epoxy resins, bis-maleimides ("BMI") resins, phenolic cyanate ester resins, polyether ether ketone ("PEEK") resins, polyetherimide ("PEI") resins, and liquid-crystal polymer ("LCP") resins). Fiberglass may include any forms of yarns, including untwisted forming cakes, rovings, chopped fibers. In various embodiments, the fiberglass may conform to military specifications such as MIL-R-60346, Type IV and MIL-Y-1140H. Exemplary fiberglass includes e-glass, S-2 glass Fiber® (a registered mark of the AGY Holding Corporation), and ZenTron® (also a registered mark of the AGY Holding Corporation).

The term "heatshrink material" may refer to any suitable covering for the harness capable of contracting when heated. Exemplary suitable heatshrink material for various embodiments may include heatshrink tubing, heatshrink sleeving, heatshrink tape, heatshrink boots, and heatshrink backshell assemblies. In various embodiments the heatshrink material may comprise modified elastomeric materials or polyolefins. In various embodiments these materials may have characteristics which include at least one of being soft, relatively thick (e.g., more than about ⅛ of an inch), relatively thermally resistant (e.g., to temperatures below about 518° F. (about 270° C.), electrical insulation, improved weathering to oxygen, light, or ozone, and improved resistance to chemicals.

In various embodiments, the heatshrink material may form part of the harness, such as a heatshrink boot and, in various embodiments, may be configured to contract to become secured on a boot seat of an electrical connector. In various embodiments, the heatshrink boot may be substantially straight or may be angled (e.g., having an angle of about 30° or more, an angle of about 45°, or an angle of about 90°). Suitable heatshrink boots include the KTKK cable assemblies commercially available from IS-RAY-FAST owned by TE Connectivity®.

In various embodiments, the heatshrink material may be removable, such as heatshrink tape. In various embodiments, the heatshrink material may be placed onto a braided shield after resin has been applied to form a resin infused shield. In various embodiments, by curing a resin infused braided shield covered in part with a heatshrink material, increased or uniform pressure may be applied to the braided shield. Without being limited to any theory, it is believed that in various embodiments, the contraction of the heatshrink material before the curing of the resin may help more uniformly infuse the resin into the braided shield.

Referring to FIG. 1, an electrical harness shield construction is shown according to various embodiments. In various embodiments, harness 100 may comprise two, two-core, shielded, jacketed cables 102 and single-core shielded, jacketed cable 110, and combinations thereof. While only two-core and single-core, shielded jacketed cables are exemplified in FIG. 1, according to various embodiments, a harness may comprise any type of shielded jacketed cables (e.g., three-core shielded jacketed cables, four-core shielded jacketed cables, etc.). In various embodiments, harness 100, fiberglass 108 may be in direct contact with braided shield layer 106. In various embodiments, braided shield layer 106 may be at least partially resin infused. The two, two-core, shielded, jacketed cables 102 and single-core shielded, jacketed cable 110 may comprise an electrically conductive wire 112, and braided shield layer 104. Braided shield 104 may comprise, according to various embodiments, a MCF braided shield or a nickel coated copper braided shield. In various embodiments, the two, two-core, shielded, jacketed cables 102 and single-core shielded, jacketed cable 110 may also comprise other layers, such as dielectric insulator layers 114, 116, 118, 120, and 122.

The weave of a braided shield is not particularly limited and in various embodiments may include various types of plain weaves, basket weaves, twill weaves, and satin weaves. In various embodiments the weave may be a finer weave to allow for improved coverage and, thus, improved shielding (e.g., EMI shielding). Also, in various embodiments, finer weaves providing improved coverage may permit the use of large diameter backshells and small wire bundles. Without being limited to any theory, it is believed that finer weaves may help to protect against windowing in response to harness flexing, thus providing improved shielding. The braided shields are not particularly limited in form and may be in the form of a braided sock or may be woven onto the electrical harness from a reel of material. In various embodiments, fibers may be woven from two or more spools, three or more spools, or four or more spools. It will be appreciated that the number of spools may affect the density of the weave of a braided shield and may be changed to achieve desired densities or coverage. Exemplary coverage may range according to various embodiments from about 60% coverage to about 99.8% coverage, from about 65% coverage to about 95% coverage, from about 70% coverage to about 85% coverage.

The braided shields disclosed herein are not particularly limited and may include nickel coated copper braided shields and metal clad fibers. For example, referring to FIG. 1, various embodiments of harness 100 may comprise braided shield 104, which surrounds two, two-core, shielded, jacketed cables 102. In various embodiments, braided shield 104 may comprise nickel coated copper braided shields. In various embodiments, braided shield 104 may comprise a MCF.

Figure 2:
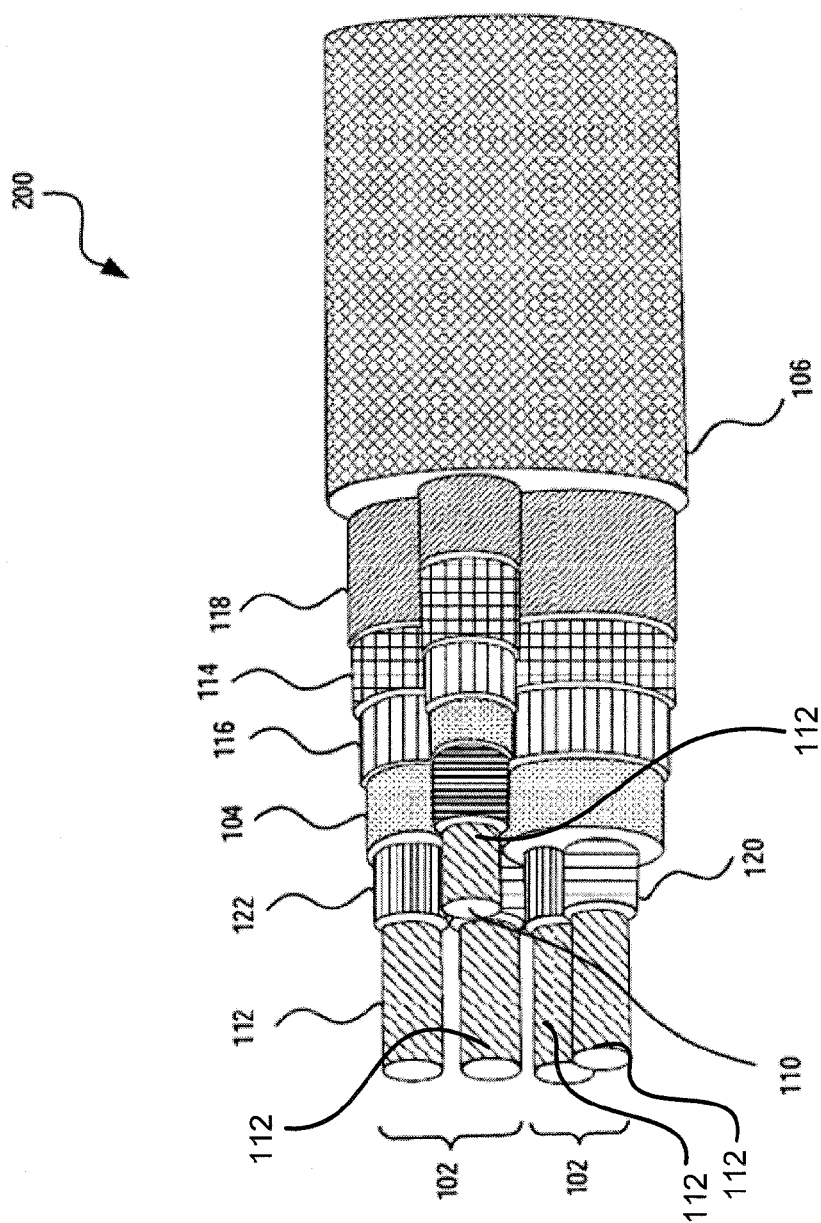
FIG. 2 illustrates a shield construction of a harness according to various embodiments.

Referring to FIG. 2, a braided shield construction according to various embodiments is illustrated. In various embodiments, harness 200 may comprise two, two-core, shielded, jacketed cables 102 and single-core shielded, jacketed cable 110, and combinations thereof. In various embodiments, braided shield layer 106 may be in direct contact with dielectric insulator layer 118 and braided shield layer 106 may be at least partially resin infused. The two-core, shielded jacketed cables 102 and single-core shielded, jacketed cables 110 may comprise an electrically conductive wire 112 and braided shield layer 104. Harness 200 does not comprise a fiberglass overbraid layer, such as fiberglass overbraid layer 108 (shown in FIG. 1). In various embodiments, shielded, jacketed cables 102 and 110 may also comprise other layers, such as dielectric insulator layers 114, 116, 118, 120, and 122, and may also comprise braided shield 104. While only two-core and single-core, shielded jacketed cables are exemplified in FIG. 2, according to various embodiments, harness 200 may comprise any number of shielded jacketed cables (e.g., three-core shielded jacketed cables, four-core shielded jacketed cables, etc.).

Figure 3A:
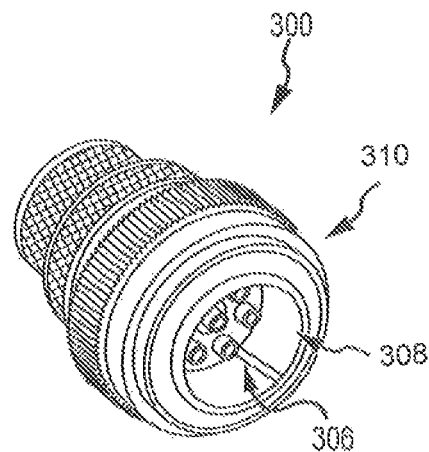
FIGS. 3A-3B illustrate various views of electrical connectors according to various embodiments.
Figure 3B:
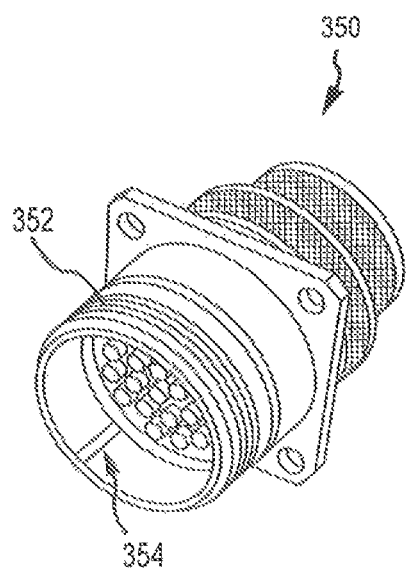

Referring to FIGS. 3A and 3B, a view of an electrical connector 300, which may be attached to a receptacle 350, is illustrated according to various embodiments. In various embodiments, electrical connector 300 may fit into receptacle 350 through various keyways 306 and 354. In various embodiments, electrical connector 300 may comprise a lock ring 310 which may engage in threading 352 of receptacle 350. In various embodiments, the wires may be connected to electrical connector 300 through electrical connector opening 308.

In various embodiments, electrical connector 300, locking ring 310, and receptacle 350 may be made of various materials, such as at least one of aluminum, stainless steel, and alloys thereof. In various embodiments, electrical connector 300 and receptacle 350 may comply with various industrial and governmental standards and be fully interchangeable and intermateable with connectors that comply with such industrial and governmental standards, such as EN2997, MIL-C-83723 Series III & ESC 10 and 15 connectors, and 983 series connectors commercially available from DEUTSCH, the connection platform of TE Connectivity®.

Figure 4:
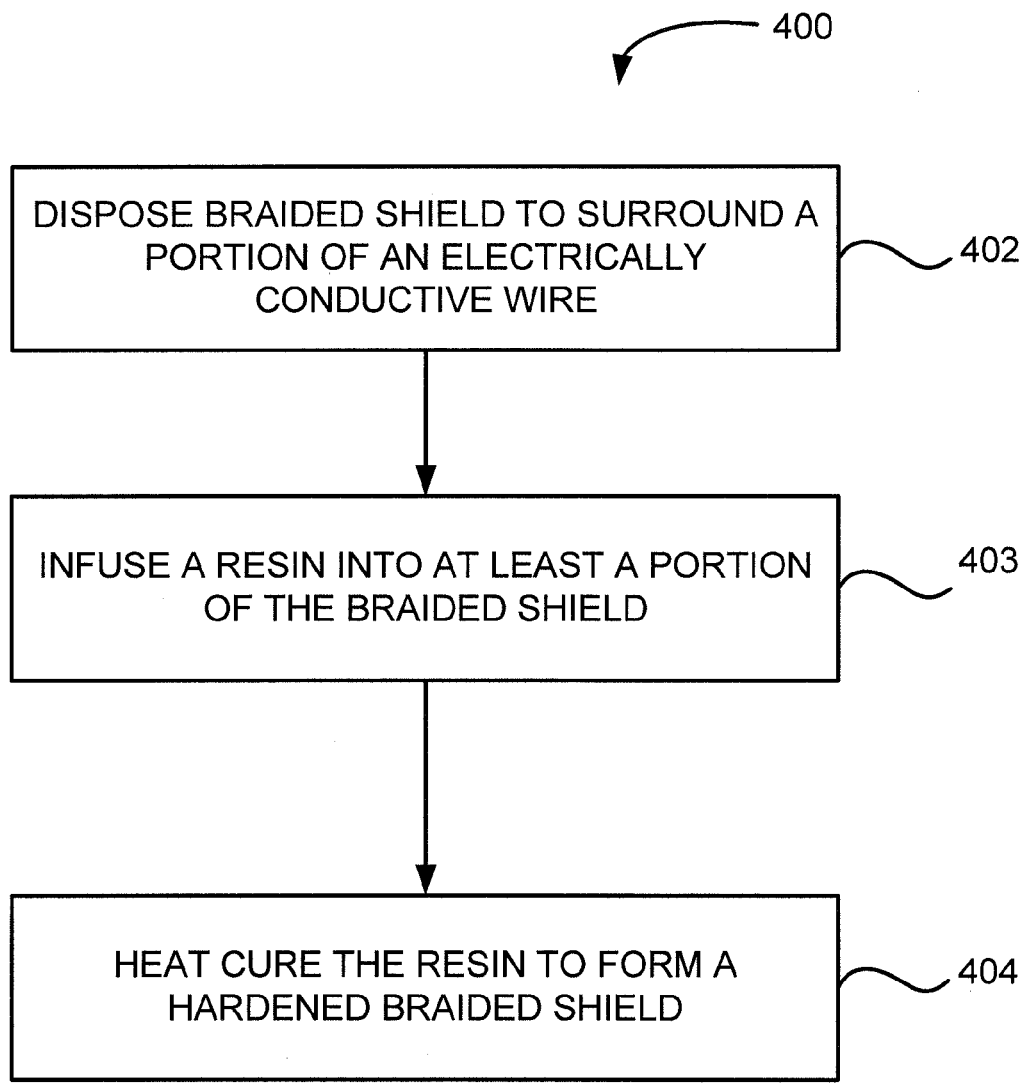
FIG. 4 illustrates methods of making an electrical harness according to various embodiments.

With reference to FIG. 4, methods 400 of making electrical harnesses according to various embodiments are illustrated. Methods 400 may comprise disposing braided shield to surround at least a portion of an electrically conductive wire illustrated as step 402 and infusing a resin into at least a portion of the braided shield illustrated as step 403. Heat curing the resin (step 404) of the resin infused braided shield is performed to form a hardened braided shield.

Figure 5:
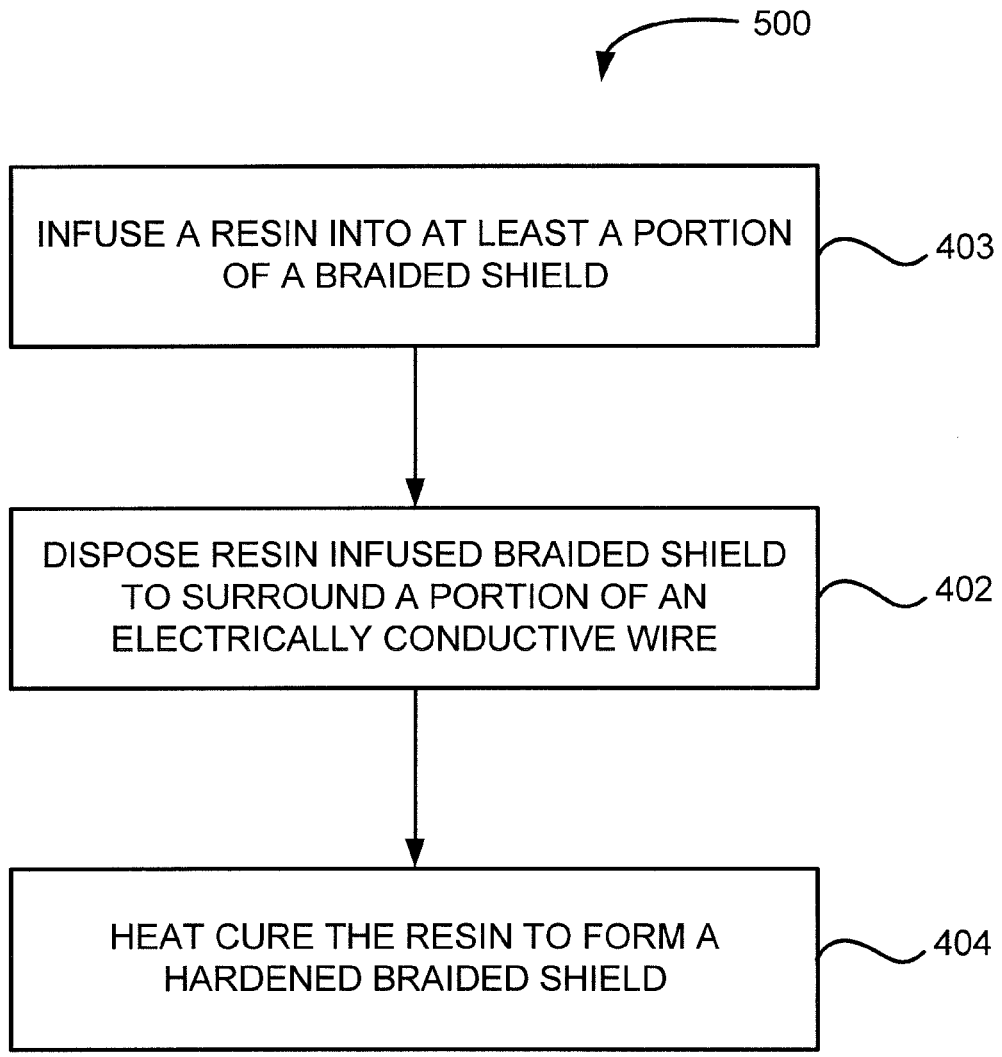
FIG. 5 illustrates methods of making an electrical harness according to various embodiments.

With reference to FIG. 5, methods 500 of making electrical harnesses according to various embodiments are illustrated. Methods 500 may comprise infusing a resin into at least a portion of a braided shield (step 403). The resin infused braided shield may, in various embodiments, be disposed to surround a portion of an electrically conductive wire (step 402). The resin may, in various embodiments, be cured by heat to form a hardened braided shield (step 404).

Figure 6:
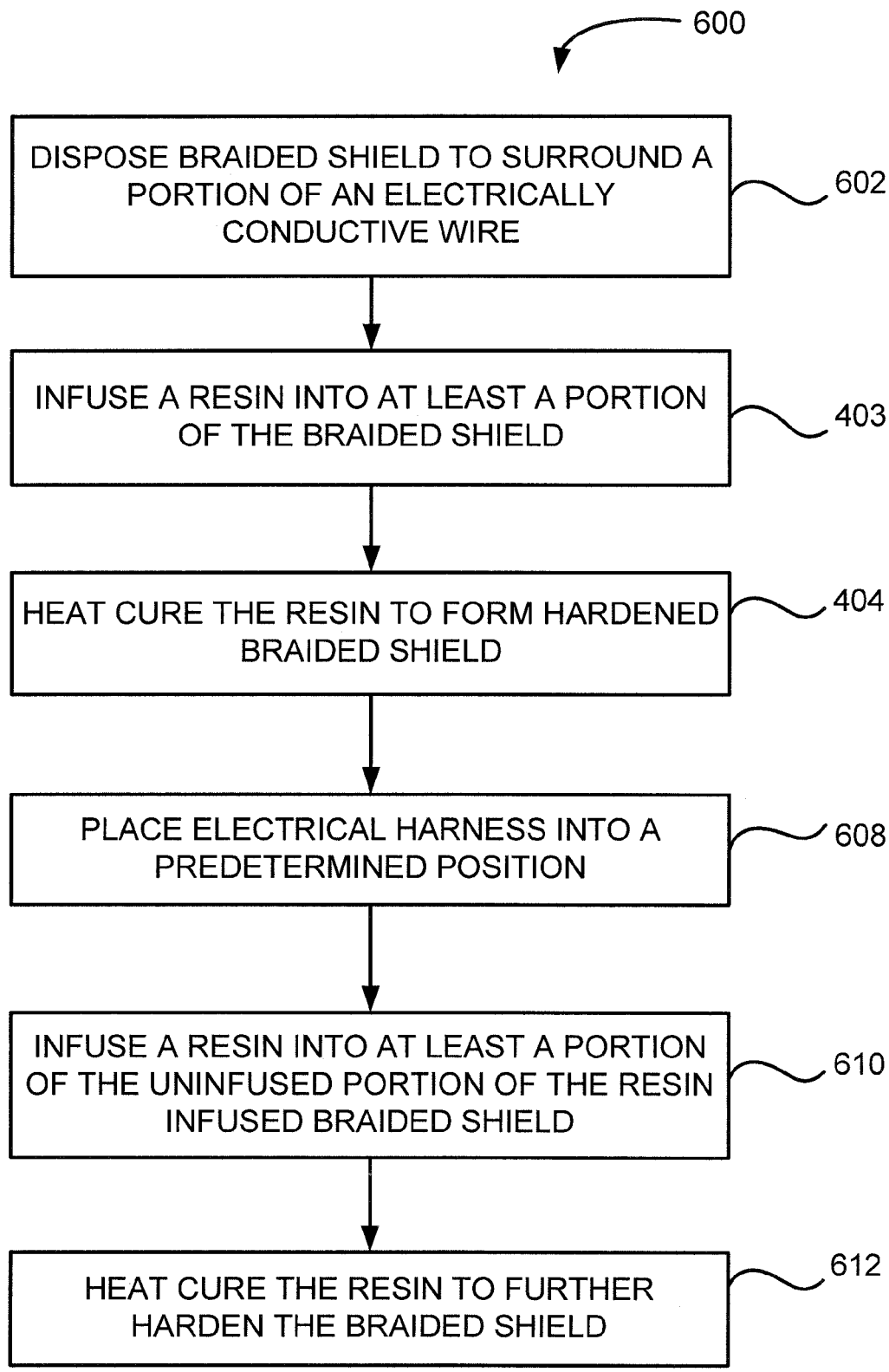
FIG. 6 illustrates methods of making an electrical harness according to various embodiments.

With reference to FIG. 6, methods 600 of making electrical harnesses according to various embodiments are illustrated. According to various embodiments, methods 600 may comprise disposing a braided shield to surround a portion of an electrically conductive wire (step 602). In various embodiments, the electrically conductive wire may form part of a shielded jacketed cable (e.g., a single-core shielded jacketed cable, a two-core shielded jacketed cable, a three-core shielded jacketed cable, etc.). Methods 600 also comprise infusing a resin into at least a portion of the braided shield (step 403). In various embodiments, the resin infused braided shield surrounding a portion of the electrically conductive wire may only be partially infused. The term "partially infused" may include a braided shield where at least one portion of the braided shield is not infused with resin. In various embodiments, by not infusing the entire braided shield, the shape of the braided shield may be manipulated, for example, during installation. Also, in various embodiments, not infusing the entire braided shield may have desired benefits, such as improved ease of packing for shipping.

Methods 600 may also comprise heat curing the resin to form a hardened braided shield (step 404). In various embodiments, a hardened braided shield may be a braided shield wherein only a portion of the braided shield is hardened (e.g., the portions of the braided shield infused with resin). Methods 600 may therefore comprise placing the electrical harness into a predetermined position, such as in a turbojet engine build up area (step 608). During step 608, clamps and or other supporting mechanism may be used to hold the harness into a predetermined position. The uninfused portions of the harness may remain flexible so that during installation, the final shape of the harness may be adjusted to fit the installation more precisely.

According to various embodiments, at least a portion of the uninfused portions of the braided shield may be infused with a resin (step 610). The infused resin from step 610 may be heat cured (e.g., with a heat gun or heat lamp) (step 612) and may improve the overall hardness of the braided shield. The resin is not particularly limited and may, in various embodiments, comprise at least one of a polyurethane resin and an epoxy resin. In various embodiments of step 612, the harness may be hardened to be sufficiently stiff so there is enough support for the harness to support its own weight without any sag. Thus, according to various embodiments, once the harness is hardened, some of the clamps or other supporting material may be removed. In various embodiments, this may aid in helping to prevent a braided shield from sagging due to external forces (e.g., gravity) which may induce sagging or other undesired deformations in the braided shield prior to or after the braided shield is infused with resin.

Various methods of making electrical harnesses are disclosed herein. According to various embodiments, methods of making an electrical harness comprising disposing a braided shield to surround at least a portion of an electrically conductive wire, infusing a resin into at least a portion of the braided shield, and heat curing the resin to form a hardened braided shield are disclosed. In various embodiments, disclosed methods may further comprise disposing a fiberglass overbraid layer to at least partially surround the electrically conductive wire. Methods may also comprise, after the heat curing, infusing a resin into the braided shield according to various embodiments. Suitable methods include infusing performed by a brush application, under at least one of a partial vacuum, an external pressure from a heat shrink tape, and an external pressure from an autoclave. Various methods may also include methods wherein the electrically conductive wire forms part of a shielded jacketed cable, and the braided shield is disposed around the shielded jacketed cable. In some embodiments, where a portion of the resin infused braided shield is uninfused with resin, various methods may further comprise placing the electrical harness into a predetermined position in a turbojet engine build up area and infusing a resin into at least a portion of the uninfused portion of the resin infused braided shield.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of embodiments encompassed by this disclosure. The scope of the claimed matter in the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. §112(f), unless the element is expressly recited using the phrase "means for." As used herein, the terms "comprises", comprising", or any other variation thereof, are intended to cover a non-exclusive inclusion, such that a process, method, article, or apparatus that comprises a list of elements does not include only those elements but may include other, elements not expressly listed or inherent to such process, method, article, or apparatus.

What is claimed is:

1. An electrical harness comprising:
an electrically conductive wire; and
a braided shield surrounding a portion of the electrically conductive wire,
wherein at least a portion of the braided shield is infused with a curable resin,
wherein the curable resin is at least one of a polyurethane resin, a methacrylate resin, and an epoxy resin, and
wherein said shield is substantially non-conductive.

2. The electrical harness of claim 1, further comprising a fiberglass overbraid layer at least partially surrounding the electrically conductive wire.

3. The electrical harness of claim 1, wherein the braided shield comprises metal and has a coverage of about 60% to 99.8%.

4. The electrical harness of claim 1, wherein the curable resin has undergone a curing process to form a sufficiently hardened portion capable of substantially resisting deformation due to an external force.

5. The electrical harness of claim 1, wherein the braided shield is at least one of a metal clad fiber braided shield and a nickel coated copper braided shield.

6. The electrical harness of claim 1, wherein the braided shield comprises at least one of a thermoplastic fiber, an aramid fiber, a carbon fiber, a stainless steel micro filament, and a copper fiber.

7. The electrical harness of claim 1, wherein
the electrical harness comprises a plurality of shielded, jacketed cables and
the braided shield infused with the curable resin surrounds the plurality of shielded, jacketed cables.

8. An electrical harness comprising:
an electrically conductive wire; and
a braided shield surrounding a portion of the electrically conductive wire, wherein
at least a first portion of the braided shield is impregnated with a first cured resin imparting rigidity to the first portion of the braided shield, wherein the first portion of the braided shield is substantially non-conductive and
at least a second portion of the braided shield that is pliable.

9. The electrical harness of claim 8, wherein the second portion of the braided shield is disposed between the first portion of the braided shield and a third portion of the braided shield that comprises a second cured resin.

10. The electrical harness of claim 8, wherein the second portion of the braided shield is disposed between the first portion of the braided shield and an electrical connector.

11. The electrical harness of claim 8, wherein the second portion comprises between about 5 percent and 50 percent of the total length of the electrical harness.

12. The electrical harness of claim 8, wherein the electrical harness comprises a third portion of the braided shield that is pliable.

13. The electrical harness of claim 9, wherein the first cured resin and the second cured resin are different.

14. The electrical harness of claim 9, wherein the first cured resin and the second cured resin are identical.

15. The electrical harness of claim 8, wherein the second portion of the braided shield comprises an uncured curable resin.

* * * * *